United States Patent
Pao et al.

(10) Patent No.: US 12,429,440 B1
(45) Date of Patent: Sep. 30, 2025

(54) WAFER MEASUREMENT SYSTEM USING TIME-OF-FLIGHT MEDIUM-ENERGY ION SCATTERING SIGNAL

(71) Applicant: K-MAC TECHNOLOGY CORP., Taipei (TW)

(72) Inventors: Yu-Chiang Pao, Taipei (TW); Yao-Yu Chang, Taipei (TW); Yuh-Yih Lu, Taipei (TW); Kyu-Sang Yoo, Anyang-si (KR); Soo-Bang Kim, Anyang-si (KR)

(73) Assignee: K-MAC TECHNOLOGY CORP., Taipei (TW)

( * ) Notice: Subject to any disclaimer, the term of this patent is extended or adjusted under 35 U.S.C. 154(b) by 0 days.

(21) Appl. No.: 19/028,608

(22) Filed: Jan. 17, 2025

(30) Foreign Application Priority Data

Mar. 26, 2024 (TW) .................................. 113111278

(51) Int. Cl.
  *G01N 23/20008* (2018.01)
(52) U.S. Cl.
  CPC .................. *G01N 23/20008* (2013.01); *G01N 2223/6116* (2013.01); *G01N 2223/643* (2013.01)
(58) Field of Classification Search
  None
  See application file for complete search history.

(56) References Cited

FOREIGN PATENT DOCUMENTS

| CN | 202246731 U | * | 5/2012 | |
|---|---|---|---|---|
| DE | 102022204693 A1 | * | 11/2022 | ......... G01B 11/0625 |
| TW | 202004171 A | | 1/2020 | |
| TW | 202135121 A | * | 9/2021 | ............ C23C 14/48 |
| TW | 202246731 A | | 12/2022 | |
| TW | 202338908 A | | 10/2023 | |
| TW | I791815 B | * | 11/2023 | |
| WO | 2023063675 A1 | | 4/2023 | |

* cited by examiner

*Primary Examiner* — Andrew Smyth
(74) *Attorney, Agent, or Firm* — MUNCY, GEISSLER, OLDS & LOWE, P.C.

(57) ABSTRACT

A wafer measurement system using a time-of-flight medium-energy ion scattering (TOF-MEIS) signal is provided. The wafer measurement system is adaptable to the manufacturing process environment of each type of currently existing semiconductor wafers or is suitable for measuring wafers or samples made of each type of currently existing semiconductors. In addition to producing the operational effect of multiplexing for concurrent processes, the wafer measurement system can enhance the precision of analysis of to-be-measured wafers or samples thanks mainly to its technical features, which include the control unit being electrically matched to and electrically controlling the other components and adapting those components to a clean-room environment with a predetermined degree of cleanliness in a predetermined working time cycle.

20 Claims, 7 Drawing Sheets

WAFER MEASUREMENT SYSTEM USING TIME-OF-FLIGHT MEDIUM-ENERGY ION SCATTERING SIGNAL

BACKGROUND OF THE INVENTION

1. Technical Field

The present invention relates to a wafer measurement technique and more particularly to a wafer measurement system that uses a time-of-flight medium-energy ion scattering signal.

2. Description of Related Art

A time-of-flight medium-energy ion scattering (TOF-MEIS) signal is used in an analysis based on TOF-MEIS, e.g., an analysis in which a beam of medium-energy ions is directed to a to-be-measured semiconductor wafer or sample in a pulsed, or intermittent (i.e., discontinuous), manner in a fixed cycle, and in which the time of flight of the scattered ions (e.g., He ions) is detected and then converted into energy in order to analyze the composition or thickness of the to-be-measured wafer or sample; in other words, the time it takes a scattered ion to reach a particle detector is detected and converted into an energy spectrum for analyzing the to-be-measured wafer or sample.

The foregoing measuring technique, however, must be performed in a clean-room environment with a predetermined degree of cleanliness in order for a to-be-measured wafer or sample to be measured with high precision. Therefore, the objective of the optimization or improvement intended by the present invention is to adapt the aforesaid technique to the manufacturing process environment of each type of currently existing semiconductor wafers, or to make the aforesaid technique suitable for use in the environment required to perform TOF-MEIS-based measurement on wafers or samples made of each type of currently existing semiconductors, thereby reducing factors that may affect the precision of the measurement data obtained, such as the particle background or electronic noise inadvertently caused by the discontinuous generation of low-energy scattered ions in a TOF-MEIS-based measurement environment.

BRIEF SUMMARY OF THE INVENTION

To improve the aforementioned problems of the prior art, the present invention provides a wafer measurement system that uses a TOF-MEIS signal and that is adaptable to the manufacturing process environment of each type of currently existing semiconductor wafers or suitable for measuring wafers or samples made of each type of currently existing semiconductors. In addition to producing the notable operational effect of multiplexing for concurrent processes, the wafer measurement system can enhance the precision of analysis of to-be-measured wafers or samples thanks mainly to its technical features, which include the control unit being electrically matched to and electrically controlling the other components and adapting those components to a clean-room environment with a predetermined degree of cleanliness in a predetermined working time cycle.

To achieve the above objectives, the present invention provides a wafer measurement system that uses a TOF-MEIS signal, that is adaptable to the manufacturing process environment of each type of currently existing semiconductor wafers or is suitable for measuring wafers or samples made of each type of currently existing semiconductors, and that includes a control unit, a wafer accessing unit, a wafer transfer arm, and a TOF-MEIS signal detection unit. The control unit is electrically connected to and electrically controls the wafer accessing unit, the wafer transfer arm, and the TOF-MEIS signal detection unit individually. The wafer transfer arm is provided between the wafer accessing unit and the TOF-MEIS signal detection unit and is configured to deliver or convey a to-be-measured wafer or sample from the wafer accessing unit to the TOF-MEIS signal detection unit, where the to-be-measured wafer or sample goes through a measurement process, or to deliver or convey the to-be-measured wafer or sample having completed the measurement process from the TOF-MEIS signal detection unit to the wafer accessing unit, where the to-be-measured wafer or sample having completed the measurement process goes through a returning process.

The technical features of the wafer measurement system using a TOF-MEIS signal as disclosed herein include the control unit being electrically matched to and electrically controlling the other components and adapting those components to a clean-room environment with a predetermined degree of cleanliness in a predetermined working time cycle. These technical features enable the components to either adapt to the manufacturing process environment of each type of currently existing semiconductor wafers, or be suitable for performing a measuring process or returning process in the clean-room environment with the predetermined degree of cleanliness required for the manufacture of each type of currently existing semiconductors, thereby enhancing the precision of analysis of a to-be-measured wafer or sample.

DETAILED DESCRIPTION OF THE INVENTION

To begin with, the applicant would like to point out that throughout this specification, including the following description of an embodiment and the appended claims, all the directional terms make reference to the directions shown in the drawings listed in BRIEF DESCRIPTION OF THE SEVERAL VIEWS OF THE DRAWINGS. In addition, in the following embodiment and the drawings, identical or similar elements or structural features are indicated by the same reference numeral. Furthermore, while the structural details, features, and methods of assembly, use, and manufacture of the present invention are described at length in DETAILED DESCRIPTION OF THE INVENTION, a person of ordinary skill in the art would understand that the detailed description and the embodiment provided herein serve only to support and demonstrate that the invention can indeed be implemented accordingly but not to limit the claims of the invention.

Figure 1:
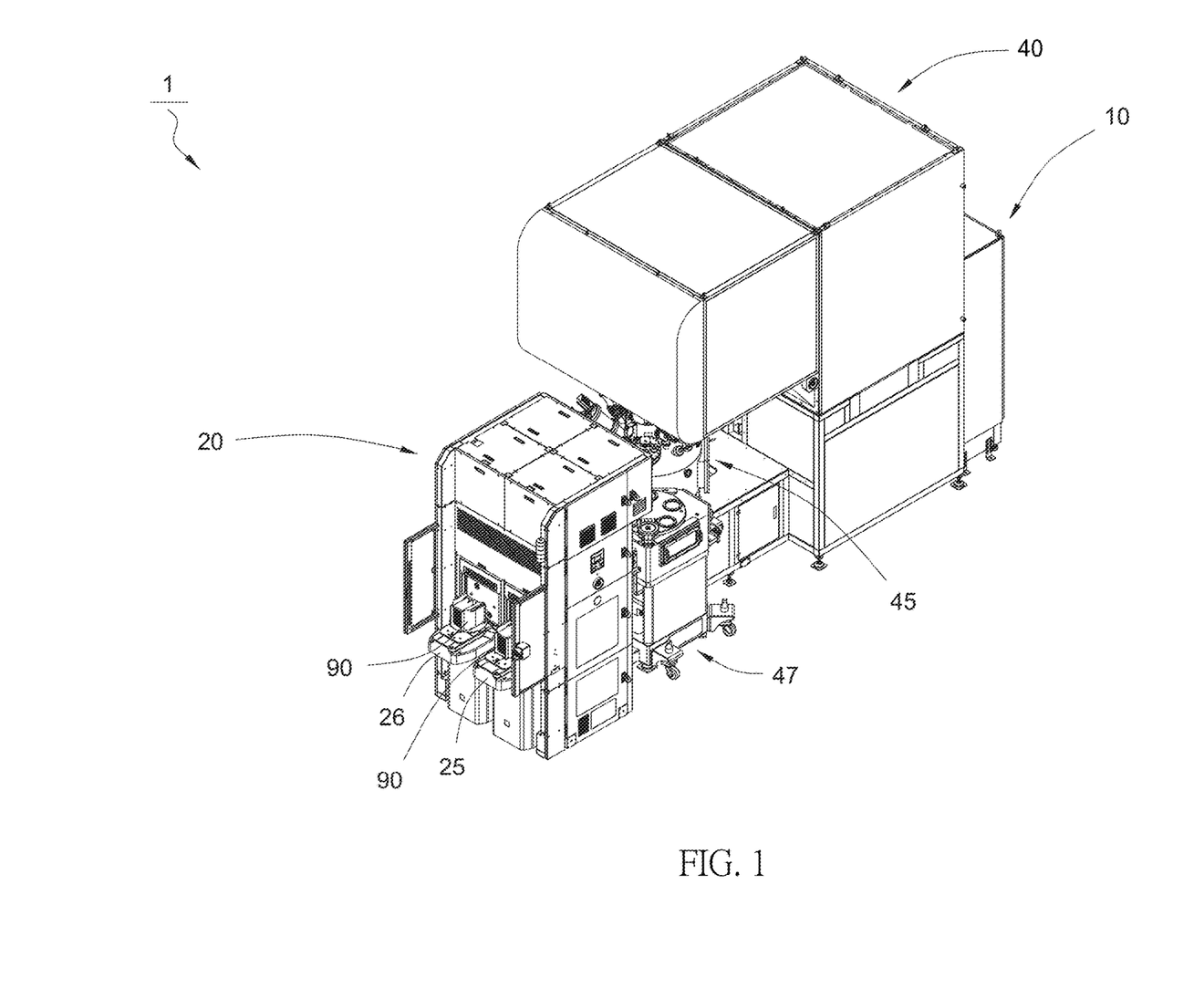
FIG. 1 is a perspective view of a preferred embodiment of the present invention, disclosing mainly a wafer measurement system that uses a TOF-MEIS signal and is adaptable to the manufacturing process environment of each type of currently existing semiconductor wafers or suitable for measuring wafers or samples made of each type of currently existing semiconductors.
Figure 2:
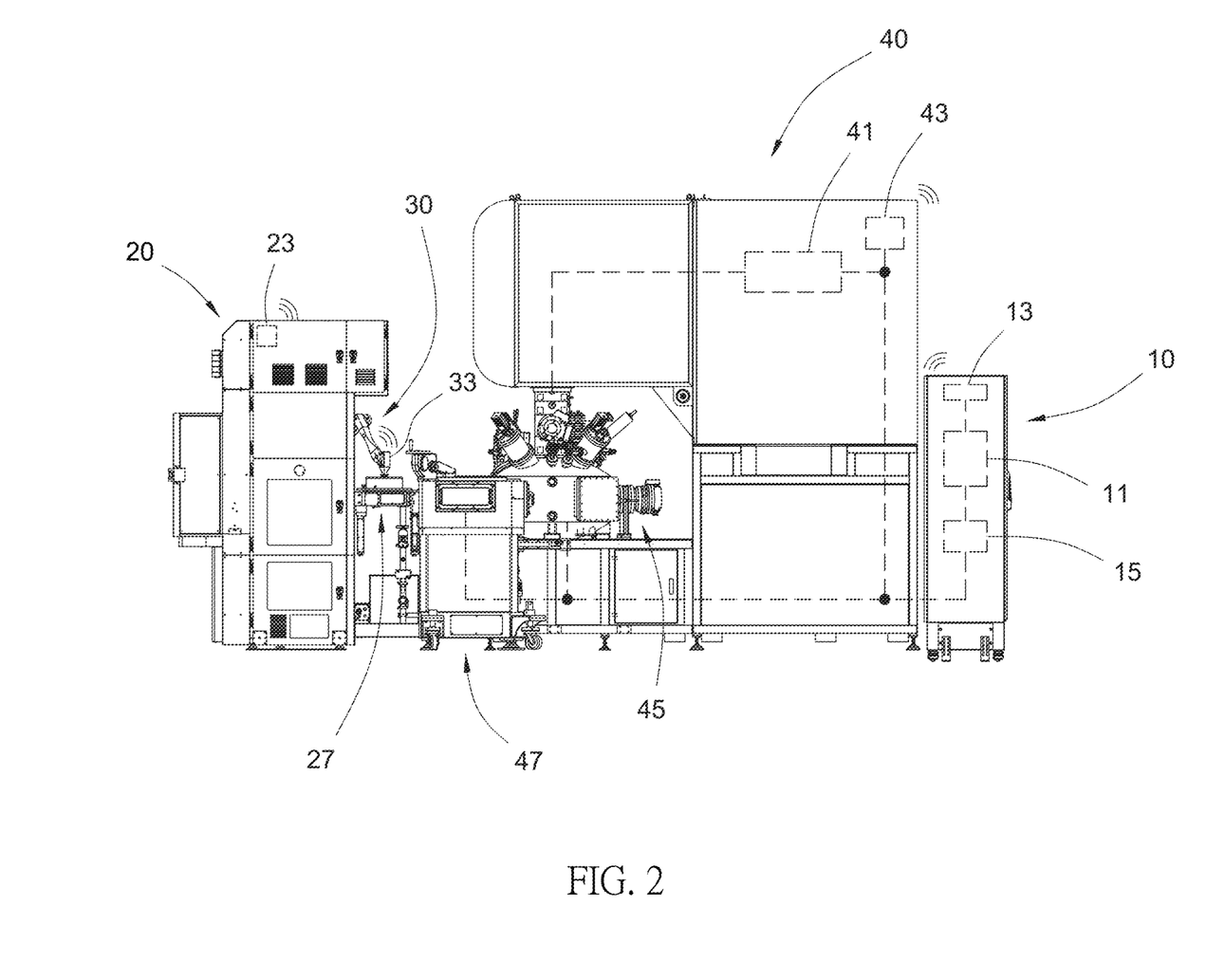
FIG. 2 is a side view of the embodiment shown in FIG. 1.
Figure 3:
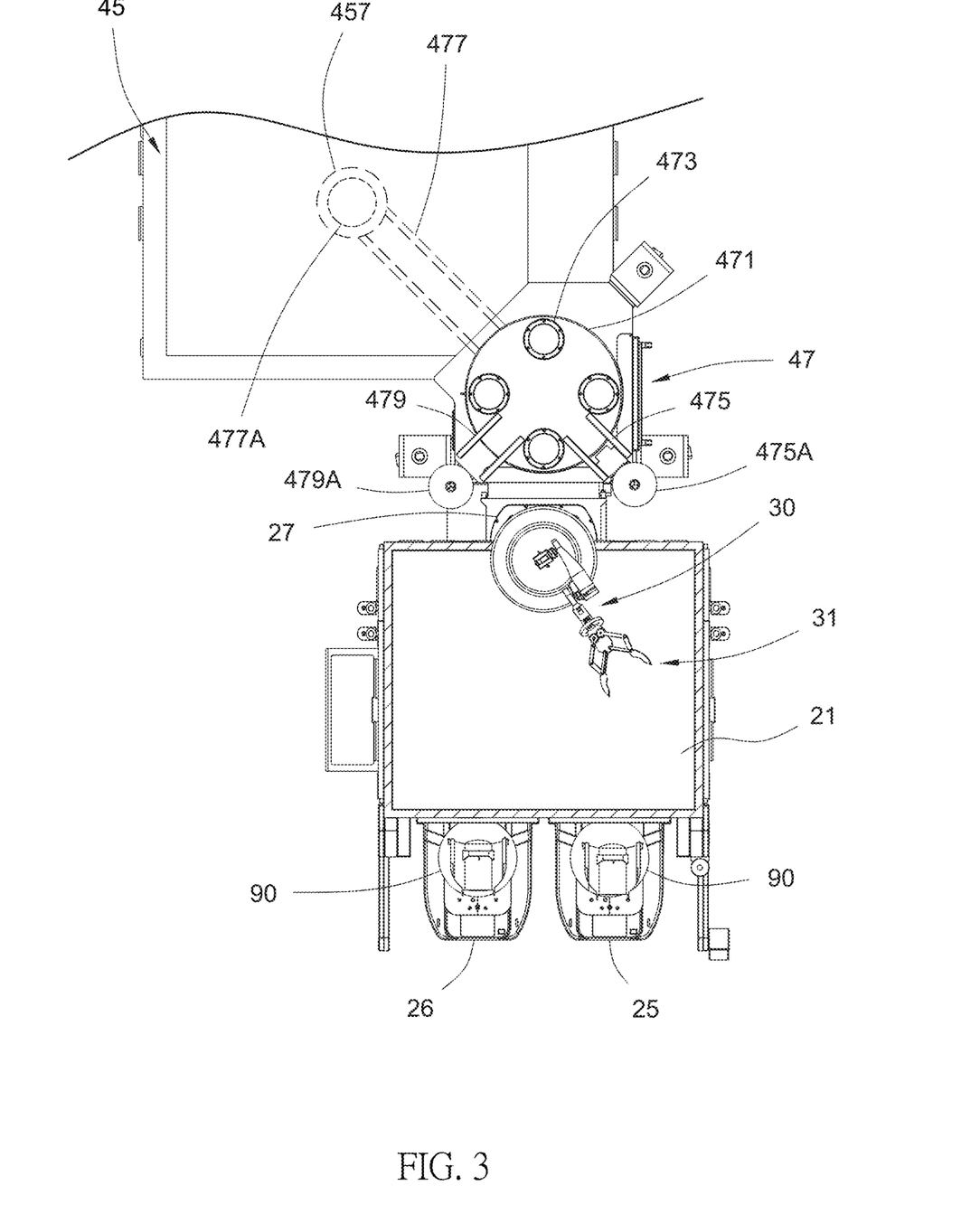
FIG. 3 is a partial top view of the embodiment shown in FIG. 1, disclosing mainly a state in which the wafer measurement system has yet to start operation.
Figure 4:
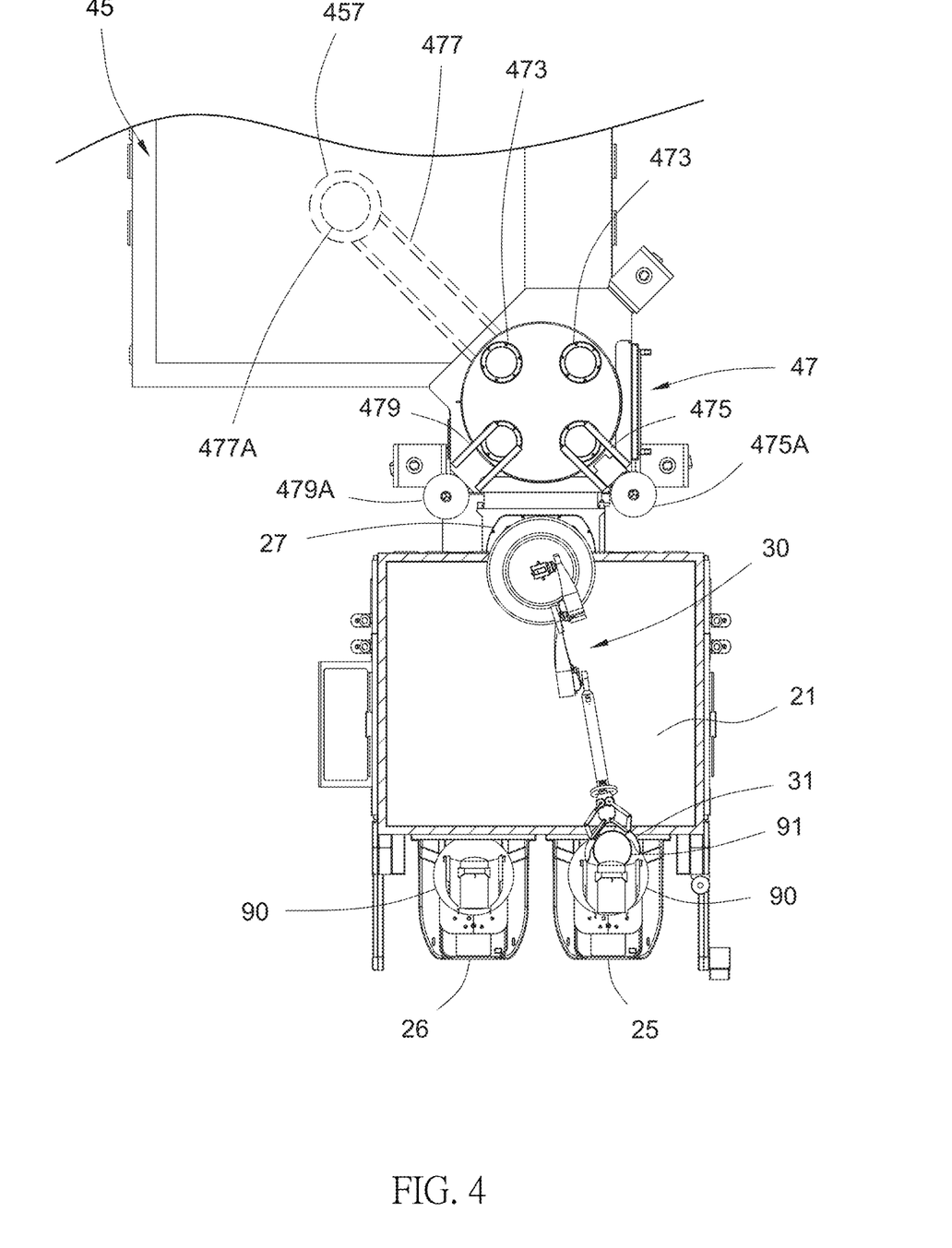
FIG. 4 is similar to FIG. 3, disclosing mainly a state in which the wafer transfer arm of the wafer measurement system is sucking up a first to-be-measured wafer or sample, and in which a second to-be-measured wafer or sample has already been placed on the rotary disc of the TOF-MEIS signal detection unit.
Figure 5:
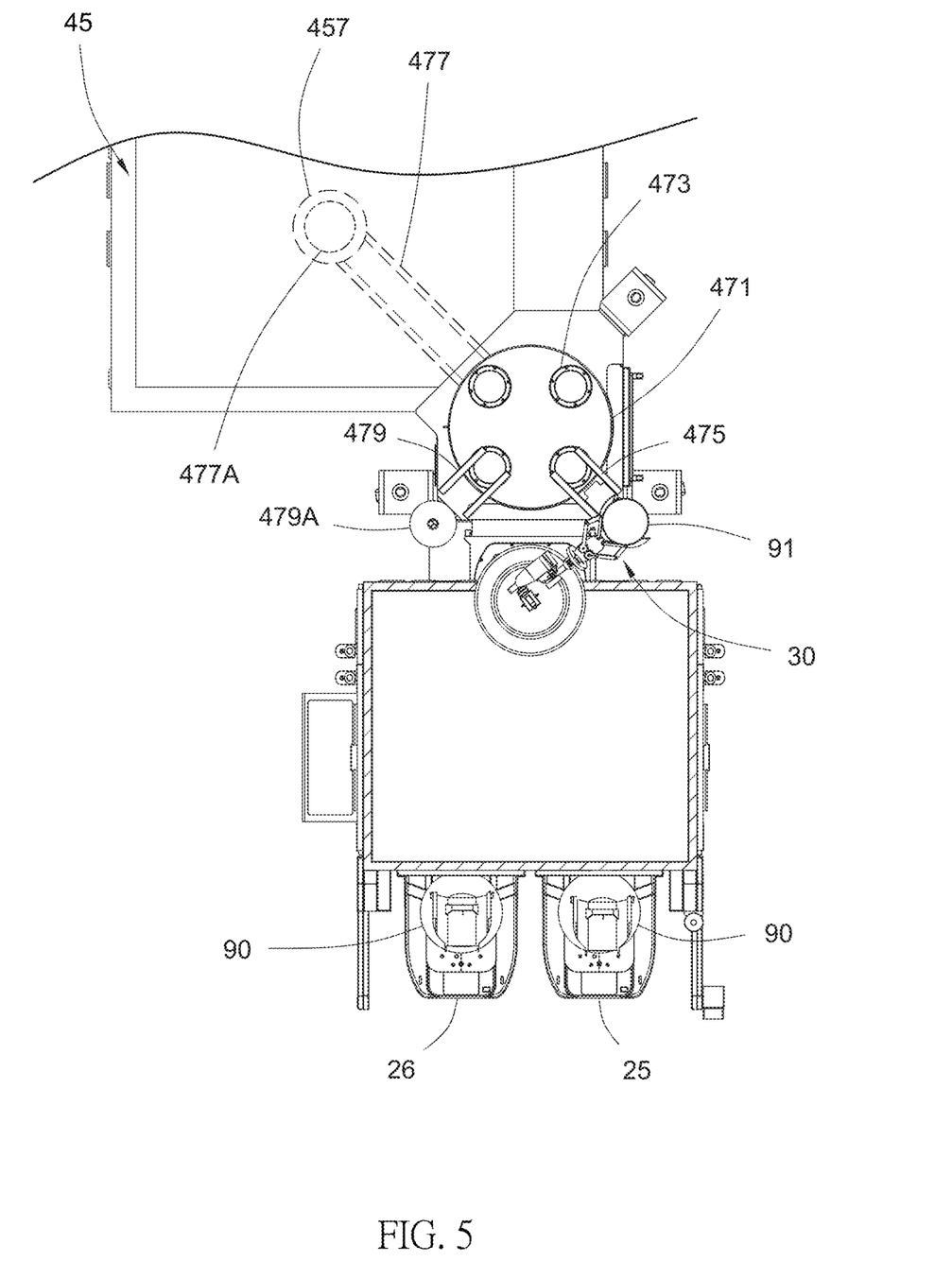
FIG. 5 is similar to FIG. 4, disclosing mainly a state in which the wafer transfer arm of the wafer measurement system is placing the first to-be-measured wafer or sample on the first wafer guide rail assembly of the TOF-MEIS signal detection unit, and in which the second to-be-measured wafer or sample corresponds to the second wafer guide rail assembly.
Figure 6:
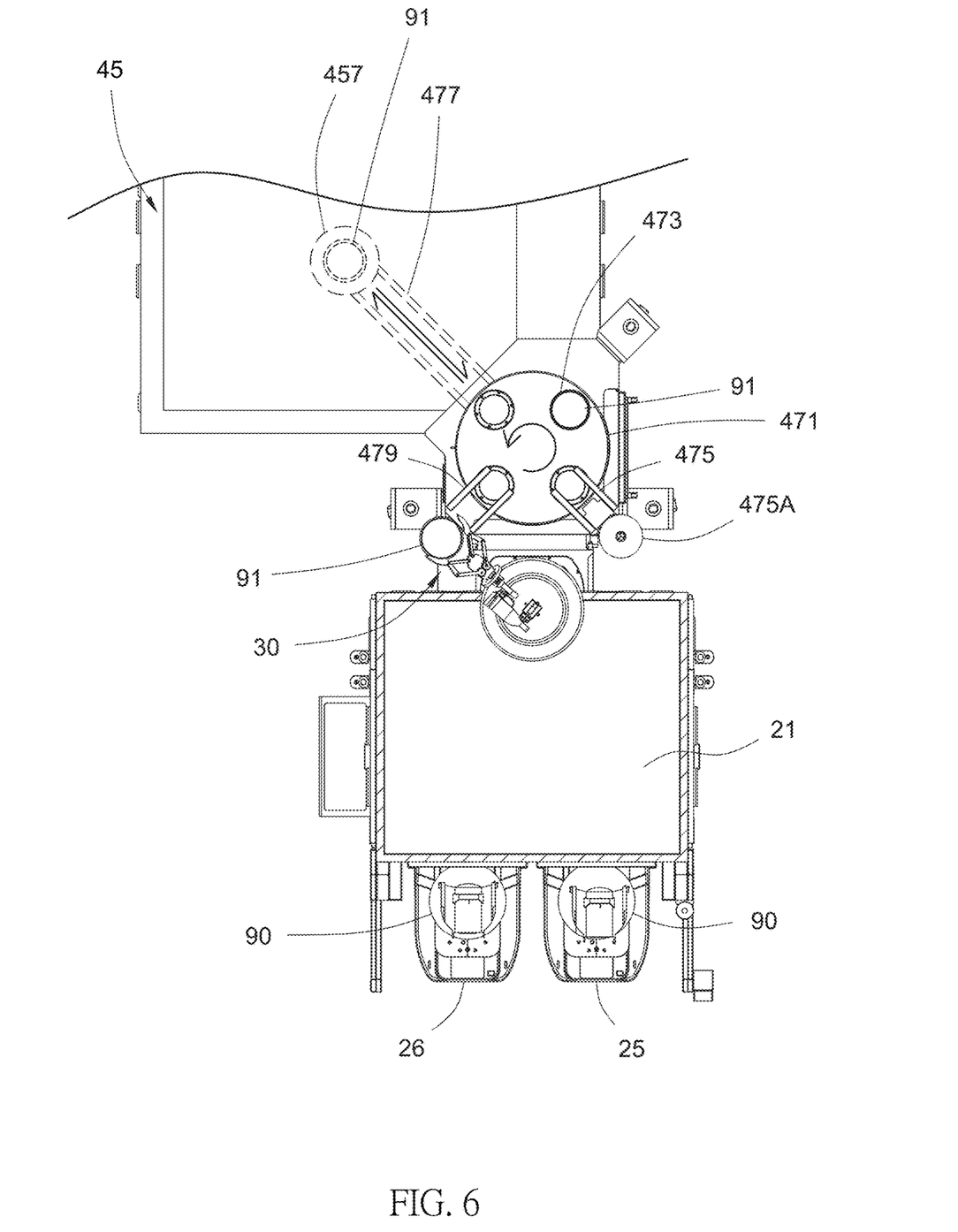
FIG. 6 is similar to FIG. 5, disclosing mainly a state in which the wafer transfer arm of the wafer measurement system is sucking up from the third wafer guide rail assembly of the TOF-MEIS signal detection unit the first to-be-measured wafer or sample, which has been measured, and in which the second to-be-measured wafer or sample has been conveyed into the detection chamber.
Figure 7:
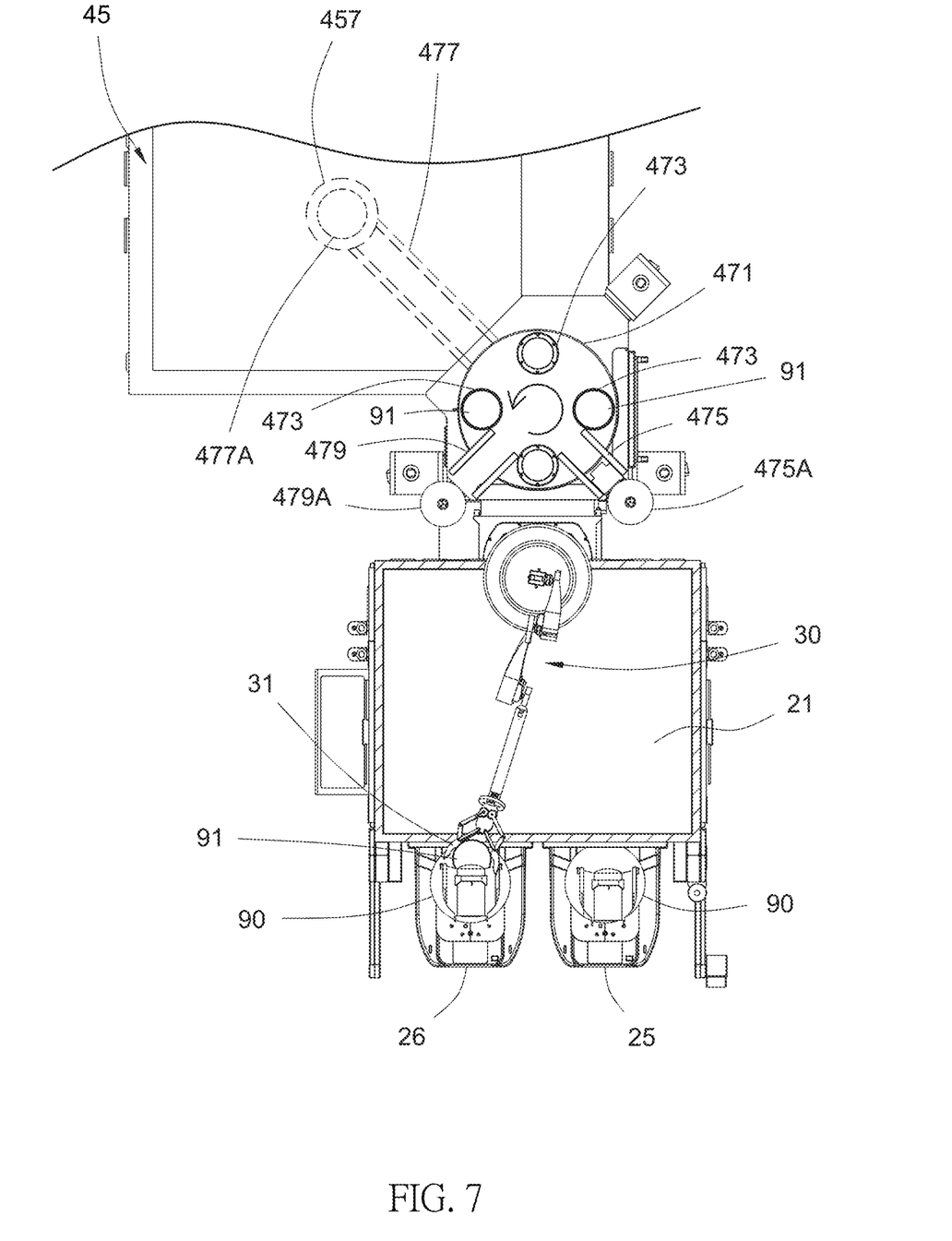
FIG. 7 is similar to FIG. 6, disclosing mainly a state in which the wafer transfer arm of the wafer measurement system is returning the first to-be-measured wafer or sample, which has been measured, and in which the second to-be-measured wafer or sample has been measured and then conveyed onto the rotary disc.

Referring to FIG. 1 to FIG. 3, a preferred embodiment of the present invention discloses a wafer measurement system 1 that uses a TOF-MEIS signal and that is adaptable to the manufacturing process environment of each type of currently existing semiconductor wafers or suitable for measuring wafers or samples made of each type of currently existing semiconductors. The wafer measurement system 1 includes a control unit 10, a wafer accessing unit 20, a wafer transfer arm 30, and a TOF-MEIS signal detection unit 40. The control unit 10 is electrically connected to and electrically controls the wafer accessing unit 20, the wafer transfer arm 30, and the TOF-MEIS signal detection unit 40 individually. The wafer transfer arm 30 is provided between the wafer accessing unit 20 and the TOF-MEIS signal detection unit 40 and is configured to pivot, deliver, or convey a to-be-measured wafer 91 or sample from the wafer accessing unit 20 to the TOF-MEIS signal detection unit 40, where the to-be-measured wafer 91 or sample goes through a measuring process, or to pivot, deliver, or convey the to-be-measured wafer 91 or sample having completed the measuring process from the TOF-MEIS signal detection unit 40 to the wafer accessing unit 20, where the to-be-measured wafer 91 or sample having completed the measurement process goes through a returning process.

With continued reference to FIG. 1 to FIG. 3, the control unit 10 is provided with a microprocessor module 11, a transmission module 13, and power supply module 15. The microprocessor module 11 of the control unit 10 is electrically connected to and electrically controls the transmission module 13 and the power supply module 15 individually. It is worth mentioning that the microprocessor module 11 of the control unit 10 can carry out data or signal transmission via the transmission module 13 according to a wireless transmission/communication protocol including but not limited to a Wi-Fi communication protocol or a near field communication (NFC) protocol, wherein the data is composed essentially of text, voice, a multimedia video, or a combination of the above. It is also worth mentioning that the microprocessor module 11 of the control unit 10 electrically controls the power supply module 15 and is electrically connected to the wafer accessing unit 20, the wafer transfer arm 30, and the TOF-MEIS signal detection unit 40 individually by way of power cord connection in order to supply the electric power required for the operation of each of the wafer accessing unit 20, the wafer transfer arm 30, and the TOF-MEIS signal detection unit 40, wherein the electric power includes but is not limited to three-phase alternating-current electric power, single-phase alternating-current electric power, or predetermined direct-current electric power selected to match, and be supplied to, each of the wafer accessing unit 20, the wafer transfer arm 30, and the TOF-MEIS signal detection unit 40. The power supply module 15 and its technical features in relation to electric power distribution either are easily conceivable by a person of ordinary skill in the art who is aware of this preferred embodiment of the present invention or involve only a simple change in quantity and therefore are not restrictive of the technical features whose patent protection is sought by the applicant.

With continued reference to FIG. 1 to FIG. 3, the wafer accessing unit 20 includes a wafer transfer platform 21, a transmission module 23, a first wafer cassette carrier 25 in communication with the wafer transfer platform 21, a second wafer cassette carrier 26 in communication with the wafer transfer platform 21, and a pivoting base 27 in communication with the wafer transfer platform 21. Depending on the actual site where the wafer measurement system 1 is used, the wafer transfer platform 21 of the wafer accessing unit 20 may selectively be received in a machine casing or be an open operation platform in order to adapt to the manufacturing process environment of each type of currently existing semiconductor wafers or to the environment of the testing operation required after the manufacture of each type of currently existing semiconductors. The wafer transfer platform 21 is well known in the art and therefore will not be described in more detail. The transmission module 23 of the wafer accessing unit 20 can be electrically controlled by the transmission module 13 of the control unit 10 according to the wireless transmission/communication protocol in use, and the transmission module 23 of the wafer accessing unit 20 is electrically connected to the wafer transfer platform 21, the first wafer cassette carrier 25, the second wafer cassette carrier 26, and the pivoting base 27 individually so that the microprocessor module 11 of the control unit 10 can electrically control the operation of the wafer transfer platform 21, the first wafer cassette carrier 25, the second wafer cassette carrier 26, and the pivoting base 27 of the wafer accessing unit 20 through the wireless electrical connection between the transmission module 13 of the control unit 10 and the transmission module 23 of the wafer accessing unit 20. Like the transmission module 13, the transmission module 23 of the wafer accessing unit 20 can perform data or signal transmission according to the wireless transmission/communication protocol in use, wherein the wireless transmission/communication protocol includes but is not limited to a Wi-Fi communication protocol or an NFC protocol, and wherein the data is composed essentially of text, voice, a multimedia video, or a combination of the above. The first wafer cassette carrier 25 and the second wafer cassette carrier 26 of the wafer accessing unit 20 are both used to carry wafer cassettes 90 (e.g., 8-inch, 12-inch, 16-inch, or 18-inch wafer cassettes) each loaded with a plurality of to-be-measured wafers 91 or samples. Preferably, the first wafer cassette carrier 25 is defined as the carrier for use by a wafer cassette 90 for supplying a plurality of to-be-measured wafers 91 or samples that have yet to be measured or otherwise tested, and the second wafer cassette carrier 26 is defined as the carrier for use by a wafer cassette 90 for supplying a plurality of to-be-measured wafers 91 or samples that have been measured or otherwise tested. It is understood that, depending on the actual site where the wafer measurement system 1 is used or on production line requirements, it is feasible to provide only one of the first wafer cassette carrier 25 and the second wafer cassette carrier 26 of the wafer accessing unit 20, and in that case, the sole wafer cassette carrier will be used to carry a wafer cassette 90 for supplying, or providing access to, a plurality of to-be-measured wafers 91 or samples that have yet to be, or have been, measured or otherwise tested. The provision of only one wafer cassette carrier is well known in the art, involves only a simple change in quantity, and therefore will not be described any further. The pivoting base 27 and the two wafer cassette carriers 25 and 26 are located on opposite sides of the wafer transfer platform 21. It is understood, however, that depending on the actual site where the wafer measurement system 1 is used or on production line requirements, the pivoting base 27 of the wafer accessing unit 20 may be provided between the first wafer cassette carrier 25 and the second wafer cassette carrier 26 instead such that the two wafer cassette carriers 25 and 26 are adjacent to and spaced apart by the pivoting base 27.

With continued reference to FIG. 1 to FIG. 3, one end of the wafer transfer arm 30 is pivotally provided on the pivoting base 27 of the wafer accessing unit 20 so that the wafer transfer arm 30 can be pivoted or rotated in a reciprocating manner between the wafer accessing unit 20 and the TOF-MEIS signal detection unit 40 by the pivoting action of the pivoting base 27 of the wafer accessing unit 20. The other end of the wafer transfer arm 30 forms a pick-and-place end 31 for sucking up and releasing a to-be-measured wafer 91 or sample. Preferably, the pick-and-place end 31 of the wafer transfer arm 30 has a U-shaped, V-shaped, Y-shaped, or circular disc-shaped configuration. Such configurations of the pick-and-place end 31 are well known in the art, involve only a simple change in shape, and therefore will not described any further. The wafer transfer arm 30 is provided with a transmission module 33. The transmission module 33 of the wafer transfer arm 30 can be electrically controlled by the transmission module 13 of the control unit 10 according to the wireless transmission/communication protocol in use so that the microprocessor module 11 of the control unit 10 can electrically control the operation of the entire wafer transfer arm 30 through the wireless electrical connection between the transmission module 13 of the control unit 10 and the transmission module 33 of the wafer transfer arm 30. Like the transmission module 13, the transmission module 33 of the wafer transfer arm 30 can carry out data or signal transmission according to the wireless transmission/communication protocol in use, wherein the wireless transmission/communication protocol includes but is not limited to a Wi-Fi communication protocol or an NFC protocol, and wherein the data is composed essentially of text, voice, a multimedia video, or a combination of the above. It is worth mentioning that depending on the actual site where the wafer measurement system 1 is used or on production line requirements, the wafer transfer arm 30 may be a multi-axis (e.g., three-axis, four-axis, five-axis, six-axis, or more-than-six-axis) wafer transfer arm in order to perform the intended actions. The use of a multi-axis wafer transfer arm is well known in the arm, involves only a simple change in configuration, and therefore will not be described any further.

Referring to FIG. 1 to FIG. 4, the TOF-MEIS signal detection unit 40 includes a TOF-MEIS signal detection module 41, a transmission module 43, a detection chamber 45, and a preparation table 47. The TOF-MEIS signal detection module 41 uses an ion generation device (not shown) to generate a predetermined ion beam that is directed to a to-be-measured wafer 91 or sample. The TOF-MEIS signal detection module 41 further uses a noise cancellation device (not shown) to apply a predetermine electric-field force in the moving direction of the ions to reduce or improve interference from the particle background on the to-be-measured wafer 91 or sample or from electronic noise. The transmission module 43 of the TOF-MEIS signal detection unit 40 is electrically connected to and electrically controls the TOF-MEIS signal detection module 41, the detection chamber 45, and the preparation table 47 individually, and the transmission module 43 of the TOF-MEIS signal detection unit 40 can be electrically controlled by the transmission module 13 of the control unit 10 according to the wireless transmission/communication protocol in use so that the microprocessor module 11 of the control unit 10 can electrically control the operation of the TOF-MEIS signal detection module 41, the detection chamber 45, and the preparation table 47 of the TOF-MEIS signal detection unit 40 through the wireless electrical connection between the transmission module 13 of the control unit 10 and the transmission module 43 of the TOF-MEIS signal detection unit 40. Like the transmission module 13, the transmission module 43 of the TOF-MEIS signal detection unit 40 can perform data or signal transmission according to the wireless transmission/communication protocol in use, wherein the wireless transmission/communication protocol includes but is not limited to a Wi-Fi communication protocol or an NFC protocol, and wherein the data is composed essentially of text, voice, a multimedia video, or a combination of the above. Preferably, the data (which is composed essentially of text, voice, a multimedia video, or a combination of the above) generated by the TOF-MEIS signal detection module 41 performing a detection operation on a to-be-measured wafer 91 or sample can be transmitted outward, either as data or a signal, via the transmission module 43 according to the wireless transmission/communication protocol in use. The detection chamber 45 and the preparation table 47 are in communication with each other. The preparation table 47 is pivotally provided with a circular rotary disc 471 and includes four wafer placement areas 473 arranged at intervals on the rotary disc 471, a first wafer guide rail assembly 475 in communication with the rotary disc 471, a second wafer guide rail assembly 477 in communication with the rotary disc 471 and the detection chamber 45 separately, and a third wafer guide rail assembly 479 in communication with the rotary disc 471. The rotary disc 471 of the preparation table 47 is spaced apart from each of the first wafer guide rail assembly 475, the second wafer guide rail assembly 477, and the third wafer guide rail assembly 479 by a predetermined distance. The size of the wafer placement areas 473 on the rotary disc 471 of the preparation table 47 can be designed according to the actual size of the to-be-measured wafers 91 or samples (whose diameter may be 8 inches, 12 inches, 16 inches, or 18 inches, for example). The first wafer guide rail assembly 475 and the third wafer guide rail assembly 479 are closer to the wafer transfer arm 30 than is the second wafer guide rail assembly 477. Preferably, the first wafer guide rail assembly 475 has an extension end 475A corresponding in position to the first wafer cassette carrier 25 of the wafer accessing unit 20, the third wafer guide rail assembly 479 has an extension end 479A corresponding in position to the second wafer cassette carrier 26 of the wafer accessing unit 20, and the second wafer guide rail assembly 477 has an extension end 477A located in a detection area 457 of the detection chamber 45. Preferably, the extension end 477A of the second wafer guide rail assembly 477 corresponds in position to and is adjacent to the detection area 457 of the detection chamber 45 so that by way of the technical feature constituted by the second wafer guide rail assembly 477, a to-be-measured wafer 91 or sample can be transferred between the detection chamber 45 and the preparation table 47, or more particularly between any of the wafer placement areas 473 of the rotary disc 471 of the preparation table 47 and the detection area 457 of the detection chamber 45, in a reciprocating manner.

Having described the technical features of the wafer measurement system 1 using a TOF-MEIS signal as disclosed in the foregoing preferred embodiment and of each component of the system, the present specification continues to disclose the main operations of the wafer measurement system 1 using a TOF-MEIS signal and their intended effects, i.e., how the system adapts to the manufacturing process environment of each type of currently existing semiconductor wafers or is rendered suitable for measuring wafers or samples made of each type of currently existing semiconductors.

First, referring back to FIG. 1 and FIG. 2, the wafer measurement system 1 using a TOF-MEIS signal as disclosed in the preferred embodiment of the present invention and all of its components are adaptable to the manufacturing process environment of each type of currently existing semiconductor wafers or are suitable for performing a measuring process in the clean-room environment with the predetermined degree of cleanliness required for the manufacture of each type of currently existing semiconductors and can therefore be used to analyze a plurality of to-be-measured wafers 91 or samples with enhanced precision. Preferably, the microprocessor module 11 of the control unit 10 sends a predetermined-degree-of-cleanliness signal to, and is thus electrically matched to and electrically controls, the transmission module 23 of the wafer accessing unit 20, the transmission module 33 of the wafer transfer arm 30, and the transmission module 43 of the TOF-MEIS signal detection unit 40 individually through wireless electrical transmission via the transmission module 13 according to the wireless transmission/communication protocol in use (e.g., a Wi-Fi communication protocol or an NFC protocol). This technical feature either enables each component of the system to adapt to the manufacturing process environment of each type of currently existing semiconductor wafers, or renders each component suitable for use in a measuring process performed in the clean-room environment with the predetermined degree of cleanliness required for the manufacture of each type of currently existing semiconductors, thereby producing the notable effect of enhancing the precision of analysis of a plurality of to-be-measured wafers 91 or samples.

Second, referring to FIG. 1 to FIG. 4, a wafer cassette 90 loaded with a plurality of to-be-measured wafers 91 or samples is mounted on the first wafer cassette carrier 25 of the wafer accessing unit 20 of the wafer measurement system 1, and a wafer cassette 90 not yet loaded with any to-be-measured wafer 91 or sample is mounted on the second wafer cassette carrier 26 of the wafer accessing unit 20 of the wafer measurement system 1. Thus, the operator can easily tell, before the testing (e.g., measuring) process begins, whether or not the plurality of to-be-measured wafers 91 or samples are ready to be tested (e.g., measured).

Third, referring to FIG. 1 to FIG. 5, the microprocessor module 11 of the control unit 10 sends a wafer transfer signal to, and is thus electrically matched to and electrically controls, the transmission module 23 of the wafer accessing unit 20, the transmission module 33 of the wafer transfer arm 30, and the transmission module 43 of the TOF-MEIS signal detection unit 40 individually through wireless electrical transmission via the transmission module 13 according to the wireless transmission/communication protocol in use (e.g., a Wi-Fi communication protocol or an NFC protocol). This technical feature leads to clockwise or counterclockwise rotation of the pivoting base 27 of the wafer accessing unit 20 such that the wafer transfer arm 30, which is pivotally provided on the pivoting base 27 of the wafer accessing unit 20, is rotated along with the pivoting base 27. The wafer transfer arm 30 then extends toward the wafer cassette 90 on the first wafer cassette carrier 25 of the wafer accessing unit 20 according to the wafer transfer signal. Following that, the wafer transfer arm 30 uses the pick-and-place end 31, which is configured for sucking up and releasing a to-be-measured wafer 91 or sample, to suck up one of the to-be-measured wafers 91 or samples in the wafer cassette 90 on the first wafer cassette carrier 25 of the wafer accessing unit 20. The pivoting base 27 of the wafer accessing unit 20 is then rotated again until the wafer transfer arm 30 faces the preparation table 47 of the TOF-MEIS signal detection unit 40. After that, the wafer transfer arm 30 uses the pick-and-place end 31, which is configured for sucking up and releasing a to-be-measured wafer 91 or sample, to make the to-be-measured wafer 91 or sample that has been sucked up correspond in position to the extension end 475A of the first wafer guide rail assembly 475 of the preparation table 47 of the TOF-MEIS signal detection unit 40 and to subsequently release the to-be-measured wafer 91 or sample. Thus, the wafer measurement system 1 using a TOF-MEIS signal as disclosed in the preferred embodiment of the present invention produces the notable effect of wireless electrical transmission and wireless communication matching.

Fourth, referring to FIG. 1 to FIG. 6, the microprocessor module 11 of the control unit 10 sends a wafer conveying signal to, and is thus electrically matched to and electrically controls, the transmission module 43 of the TOF-MEIS signal detection unit 40 through wireless electrical transmission via the transmission module 13 according to the wireless transmission/communication protocol in use (e.g., a Wi-Fi communication protocol or an NFC protocol). This technical feature leads to clockwise or counterclockwise rotation of the rotary disc 471 of the preparation table 47 such that one of the wafer placement areas 473 (hereinafter referred to as the first wafer placement area 473) on the rotary disc 471 of the preparation table 47 corresponds to the first wafer guide rail assembly 475, allowing the to-be-measured wafer 91 or sample at the extension end 475A of the first wafer guide rail assembly 475 to be conveyed by the first wafer guide rail assembly 475 to the first wafer placement area 473 on the rotary disc 471 of the preparation table 47. Then, the rotary disc 471 of the preparation table 47 is rotated clockwise or counterclockwise again until the to-be-measured wafer 91 or sample on the first wafer placement area 473 on the rotary disc 471 of the preparation table 47 corresponds in position to the second wafer guide rail assembly 477. Following that, the to-be-measured wafer 91 or sample is conveyed by the second wafer guide rail assembly 477 to the detection area 457 of the detection chamber 45 and ends up corresponding to the TOF-MEIS signal detection module 41. Preferably, the to-be-measured wafer 91 or sample is first conveyed to the extension end 477A of the second wafer guide rail assembly 477, then conveyed to the detection area 457 of the detection chamber 45 in an indirect manner, and then placed at a position corresponding to the TOF-MEIS signal detection module 41. Thus, in addition to producing the notable effect of wireless electrical transmission and wireless communication matching, the wafer measurement system 1 using a TOF-MEIS signal as disclosed in the preferred embodiment of the present invention can convey a to-be-measured wafer 91 or sample between different components of the system almost seamlessly.

Fifth, referring to FIG. 1 to FIG. 6, the microprocessor module 11 of the control unit 10 sends a wafer measurement signal to, and is thus electrically matched to and electrically controls, the transmission module 43 of the TOF-MEIS signal detection unit 40 through wireless electrical transmission via the transmission module 13 according to the wireless transmission/communication protocol in use (e.g., a Wi-Fi communication protocol or an NFC protocol). As a result of this technical feature, the TOF-MEIS signal detection module 41 uses the ion generation device to generate a predetermined ion beam directed to the to-be-measured wafer 91 or sample on the detection area 457 of the detection chamber 45, and uses the noise cancellation device to apply a predetermine electric-field force in the moving direction of the ions to reduce or improve interference from the particle background on the to-be-measured wafer 91 or sample or from electronic noise. Following that, the data obtained is sent to the transmission module 13 of the control unit 10 through wireless transmission via the transmission module 43 of the TOF-MEIS signal detection unit 40 according to the wireless transmission/communication protocol in use (e.g., a Wi-Fi communication protocol or an NFC protocol), in order for the microprocessor module 11 of the control unit 10 to perform a logic analysis operation on the data or back up the data into a predetermined database. Thus, in addition to producing the notable effect of wireless electrical transmission and wireless communication matching, the wafer measurement system 1 using a TOF-MEIS signal as disclosed in the preferred embodiment of the present invention can produce the notable effect of subjecting the data obtained by measuring a to-be-measured wafer 91 or sample to a logic analysis operation or backing up the data into a predetermined database.

Sixth, referring to FIG. 1 to FIG. 7, the microprocessor module 11 of the control unit 10 sends a wafer returning signal to, and is thus electrically matched to and electrically controls, the transmission module 23 of the wafer accessing unit 20, the transmission module 33 of the wafer transfer arm 30, and the transmission module 43 of the TOF-MEIS signal detection unit 40 individually through wireless electrical transmission via the transmission module 13 according to the wireless transmission/communication protocol in use (e.g., a Wi-Fi communication protocol or an NFC protocol). As a result of this technical feature, the to-be-measured wafer 91 or sample that has just gone through the measuring process is conveyed from the detection area 457 of the detection chamber 45 to another wafer placement area 473 (hereinafter referred to as the second wafer placement area 473) on the rotary disc 471 of the preparation table 47 by the second wafer guide rail assembly 477. Then, the rotary disc 471 of the preparation table 47 is rotated clockwise or counterclockwise again until the to-be-measured wafer 91 or sample that has just gone through the measuring process and is now on the second wafer placement area 473 on the rotary disc 471 of the preparation table 47 corresponds in position to the third wafer guide rail assembly 479. The to-be-measured wafer 91 or sample having gone through the measuring process is subsequently conveyed to the extension end 479A of the third wafer guide rail assembly 479. Following that, the pick-and-place end 31 of the wafer transfer arm 30 sucks up the to-be-measured wafer 91 or sample that has just gone through the measuring process and is now at the extension end 479A of the third wafer guide rail assembly 479 of the TOF-MEIS signal detection unit 40, and then the pivoting base 27 of the wafer accessing unit 20 is rotated again until the wafer transfer arm 30 faces the second wafer cassette carrier 26 of the wafer accessing unit 20. The wafer transfer arm 30 then extends toward the wafer cassette 90 on the second wafer cassette carrier 26 until the to-be-measured wafer 91 or sample that has gone through the measuring process and been sucked up by the pick-and-place end 31 of the wafer transfer arm 30 corresponds to a predetermined placement position in the wafer cassette 90 on the second wafer cassette carrier 26 of the wafer accessing unit 20. After that, the pick-and-place end 31 releases the to-be-measured wafer 91 or sample that has gone through the measuring process. Thus, in addition to producing the notable effect of wireless electrical transmission and wireless communication matching, the wafer measurement system 1 using a TOF-MEIS signal as disclosed in the preferred embodiment of the present invention can produce the effect of effectively moving a to-be-measured wafer 91 or sample that has gone through the measuring process to a different wafer cassette, allowing the operator to tell with ease that a plurality of to-be-measured wafers 91 or samples having gone through the measuring process have been returned.

Seventh, referring to FIG. 1 to FIG. 7, the microprocessor module 11 of the control unit 10 once again sends the aforesaid wafer transfer signal, wafer conveying signal, and wafer measurement signal to, and is thus electrically matched to and electrically controls, the transmission module 23 of the wafer accessing unit 20, the transmission module 33 of the wafer transfer arm 30, and the transmission module 43 of the TOF-MEIS signal detection unit 40 individually in a predetermined working time cycle through wireless electrical transmission via the transmission module 13 according to the wireless transmission/communication protocol in use (e.g., a Wi-Fi communication protocol or an NFC protocol). As a result of this technical feature, the wafer accessing unit 20 and its components, the wafer transfer arm 30 and its components, and the TOF-MEIS signal detection unit 40 and its components are electrically controlled by the wafer transfer signal, the wafer conveying signal, and the wafer measurement signal to pivot and deliver another to-be-measured wafer 91 or sample from the wafer accessing unit 20 to the TOF-MEIS signal detection unit 40 to complete the transfer process, the conveying process, and the measurement process, with or without simultaneously pivoting and delivering the to-be-measured wafer 91 or sample that has just gone through the measuring process from the TOF-MEIS signal detection unit 40 to the wafer accessing unit 20 to complete the returning process. Thus, in addition to producing the notable effect of wireless electrical transmission and wireless communication matching, the wafer measurement system 1 using a TOF-MEIS signal as disclosed in the preferred embodiment of the present invention can produce the operational effect of multiplexing for concurrent processes.

What is claimed is:

1. A wafer measurement system, comprising:
a control unit (10), a wafer accessing unit (20), a wafer transfer arm (30), and a time-of-flight medium-energy ion scattering (TOF-MEIS) signal detection unit (40), wherein the control unit (10) comprises a microprocessor module (11) and a transmission module (13), the microprocessor module (11) is electrically connected to and electrically controls the transmission module (13), the wafer accessing unit (20) comprises a transmission module (23), the wafer transfer arm (30) comprises a transmission module (33), and the TOF-MEIS signal detection unit (40) comprises a TOF-MEIS signal detection module (41), a transmission module (43) electrically connected to the TOF-MEIS signal detection module (41), and a noise cancellation device, wherein the noise cancellation device applies a predetermined electric-field force in an ion-moving direction; the microprocessor module (11) of the control unit (10) is electrically matched and connected to and electrically controls the transmission module (23) of the wafer accessing unit (20), the transmission module (33) of the wafer transfer arm (30), and the TOF-MEIS signal detection module (41) and the transmission module (43) of the TOF-MEIS signal detection unit (40) individually through wireless electrical transmission via the transmission module (13) of the control unit (10) according to a wireless transmission/communication protocol; and the wafer transfer arm (30) is provided between the wafer accessing unit (20) and the TOF-MEIS signal detection unit (40) and is configured to deliver or convey a to-be-measured wafer (91) or sample from the wafer accessing unit (20) to the TOF-MEIS signal detection unit (40), where the to-be-measured wafer (91) or sample goes through a measurement process, or to deliver or convey the to-be-measured wafer (91) or sample having completed the measurement process from the TOF-MEIS signal detection unit (40) to the wafer accessing unit (20), where the to-be-measured wafer (91) or sample having completed the measurement process goes through a returning process.

2. The wafer measurement system of claim 1, wherein the wafer accessing unit (20) further comprises a wafer transfer platform (21), a first wafer cassette carrier (25) in communication with the wafer transfer platform (21), a second wafer cassette carrier (26) in communication with the wafer transfer platform (21), and a pivoting base (27) in communication with the wafer transfer platform (21), and the transmission module (23) of the wafer accessing unit (20) is electrically connected to the wafer transfer platform (21), the first wafer cassette carrier (25), the second wafer cassette carrier (26), and the pivoting base (27) individually such that by being electrically matched to the transmission module (23) of the wafer accessing unit (20) through wireless electrical transmission via the transmission module (13) of the control unit (10) according to the wireless transmission/communication protocol, the microprocessor module (11) of the control unit (10) electrically controls the wafer transfer platform (21), the first wafer cassette carrier (25), the second wafer cassette carrier (26), and the pivoting base (27) of the wafer accessing unit (20) individually.

3. The wafer measurement system of claim 2, wherein the TOF-MEIS signal detection unit (40) further comprises a TOF-MEIS signal detection module (41), a detection chamber (45), and a preparation table (47), and the transmission module (43) of the TOF-MEIS signal detection unit (40) is electrically connected to the TOF-MEIS signal detection module (41), the detection chamber (45), and the preparation table (47) individually such that by being electrically matched to the transmission module (43) of the TOF-MEIS signal detection unit (40) through wireless electrical transmission via the transmission module (13) of the control unit (10) according to the wireless transmission/communication protocol, the microprocessor module (11) of the control unit (10) electrically controls the TOF-MEIS signal detection module (41), the detection chamber (45), and the preparation table (47) of the TOF-MEIS signal detection unit (40) individually.

4. The wafer measurement system of claim 3, wherein the detection chamber (45) and the preparation table (47) of the TOF-MEIS signal detection unit (40) are in communication with each other, and the preparation table (47) is pivotally provided with a rotary disc (471), wherein the rotary disc (471) of the preparation table (47) is provided with a plurality of wafer placement areas (473) arranged at intervals.

5. The wafer measurement system of claim 4, wherein the preparation table (47) of the TOF-MEIS signal detection unit (40) is provided with a first wafer guide rail assembly (475) in communication with the rotary disc (471), a second wafer guide rail assembly (477) in communication with the rotary disc (471) and the detection chamber (45) separately, and a third wafer guide rail assembly (479) in communication with the rotary disc (471), wherein the rotary disc (471) of the preparation table (47) is spaced apart from each of the first wafer guide rail assembly (475), the second wafer guide rail assembly (477), and the third wafer guide rail assembly (479) by a predetermined distance.

6. The wafer measurement system of claim 5, wherein the first wafer guide rail assembly (475) and the third wafer guide rail assembly (479) of the preparation table (47) of the TOF-MEIS signal detection unit (40) are closer to the wafer transfer arm (30) than is the second wafer guide rail assembly (477), the first wafer guide rail assembly (475) has an extension end (475A) corresponding in position to the first wafer cassette carrier (25) of the wafer accessing unit (20), and the third wafer guide rail assembly (479) has an extension end (479A) corresponding in position to the second wafer cassette carrier (26) of the wafer accessing unit (20).

7. The wafer measurement system of claim 6, wherein the second wafer guide rail assembly (477) of the preparation table (47) of the TOF-MEIS signal detection unit (40) has an extension end (477A) corresponding in position to and adjacent to a detection area (457) of the detection chamber (45).

8. The wafer measurement system of claim 2, wherein the wafer transfer arm (30) has an end pivotally provided on the pivoting base (27) of the wafer accessing unit (20), and the wafer transfer arm (30) has an opposite end provided with a pick-and-place end (31).

9. The wafer measurement system of claim 3, wherein the wafer transfer arm (30) has an end pivotally provided on the pivoting base (27) of the wafer accessing unit (20), and the wafer transfer arm (30) has an opposite end provided with a pick-and-place end (31).

10. The wafer measurement system of claim 4, wherein the wafer transfer arm (30) has an end pivotally provided on the pivoting base (27) of the wafer accessing unit (20), and the wafer transfer arm (30) has an opposite end provided with a pick-and-place end (31).

11. The wafer measurement system of claim 5, wherein the wafer transfer arm (30) has an end pivotally provided on the pivoting base (27) of the wafer accessing unit (20), and the wafer transfer arm (30) has an opposite end provided with a pick-and-place end (31).

12. The wafer measurement system of claim 6, wherein the wafer transfer arm (30) has an end pivotally provided on the pivoting base (27) of the wafer accessing unit (20), and the wafer transfer arm (30) has an opposite end provided with a pick-and-place end (31).

13. The wafer measurement system of claim 7, wherein the wafer transfer arm (30) has an end pivotally provided on the pivoting base (27) of the wafer accessing unit (20), and the wafer transfer arm (30) has an opposite end provided with a pick-and-place end (31).

14. The wafer measurement system of claim 1, wherein the control unit (10) further comprises a power supply module (15), the microprocessor module (11) of the control unit (10) electrically controls the power supply module (15) and is electrically connected to the wafer accessing unit (20), the wafer transfer arm (30), and the TOF-MEIS signal detection unit (40) individually through power cord connection.

15. The wafer measurement system of claim 2, wherein the control unit (10) further comprises a power supply module (15), the microprocessor module (11) of the control unit (10) electrically controls the power supply module (15) and is electrically connected to the wafer accessing unit (20), the wafer transfer arm (30), and the TOF-MEIS signal detection unit (40) individually through power cord connection.

16. The wafer measurement system of claim 3, wherein the control unit (10) further comprises a power supply module (15), the microprocessor module (11) of the control unit (10) electrically controls the power supply module (15) and is electrically connected to the wafer accessing unit (20), the wafer transfer arm (30), and the TOF-MEIS signal detection unit (40) individually through power cord connection.

17. The wafer measurement system of claim 4, wherein the control unit (10) further comprises a power supply module (15), the microprocessor module (11) of the control unit (10) electrically controls the power supply module (15) and is electrically connected to the wafer accessing unit (20), the wafer transfer arm (30), and the TOF-MEIS signal detection unit (40) individually through power cord connection.

18. The wafer measurement system of claim 5, wherein the control unit (10) further comprises a power supply module (15), the microprocessor module (11) of the control unit (10) electrically controls the power supply module (15) and is electrically connected to the wafer accessing unit (20), the wafer transfer arm (30), and the TOF-MEIS signal detection unit (40) individually through power cord connection.

19. The wafer measurement system of claim 6, wherein the control unit (10) further comprises a power supply module (15), the microprocessor module (11) of the control unit (10) electrically controls the power supply module (15) and is electrically connected to the wafer accessing unit (20), the wafer transfer arm (30), and the TOF-MEIS signal detection unit (40) individually through power cord connection.

20. The wafer measurement system of claim 7, wherein the control unit (10) further comprises a power supply module (15), the microprocessor module (11) of the control unit (10) electrically controls the power supply module (15) and is electrically connected to the wafer accessing unit (20), the wafer transfer arm (30), and the TOF-MEIS signal detection unit (40) individually through power cord connection.

* * * * *